United States Patent
Costa et al.

(10) Patent No.: US 7,024,890 B2
(45) Date of Patent: Apr. 11, 2006

(54) SOL-GEL PROCESS FOR THE PRODUCTION OF OPTICAL FIBER PREFORMS

(75) Inventors: Lorenzo Costa, Sommo (IT); Fulvio Costa, Sommo (IT); Matteo Crepaldi, Romentino (IT)

(73) Assignee: Degussa Novara Technology S.p.A., Novara (IT)

( * ) Notice: Subject to any disclaimer, the term of this patent is extended or adjusted under 35 U.S.C. 154(b) by 225 days.

(21) Appl. No.: 10/195,501

(22) Filed: Jul. 16, 2002

(65) Prior Publication Data

US 2003/0024277 A1    Feb. 6, 2003

(30) Foreign Application Priority Data

Aug. 1, 2001    (EP) .................................. 01118511

(51) Int. Cl.
    *C03B 37/16*    (2006.01)
    *C03B 8/02*    (2006.01)

(52) U.S. Cl. .............................. 65/395; 65/17.2; 65/440

(58) Field of Classification Search ................ 65/395, 65/440, 17.2
    See application file for complete search history.

(56) References Cited

U.S. PATENT DOCUMENTS

| | | | |
|---|---|---|---|
| 3,535,890 A | * | 10/1970 | Hansen et al. ............... 264/122 |
| 4,072,489 A | * | 2/1978 | Loxley et al. ................ 65/17.3 |
| 4,220,461 A | * | 9/1980 | Samanta ......................... 65/22 |
| 4,419,115 A | * | 12/1983 | Johnson et al. ................ 65/395 |
| 4,707,174 A | | 11/1987 | Johnson, Jr. et al. |
| 5,145,510 A | | 9/1992 | Saito et al. |
| 5,238,483 A | | 8/1993 | Miyashita et al. |

FOREIGN PATENT DOCUMENTS

| | | | |
|---|---|---|---|
| EP | 0 257 587 A1 | | 3/1988 |
| IT | WO0053536 | * | 9/2000 |
| JP | 63 074924 A | | 4/1988 |
| JP | 63 190729 A | | 8/1988 |
| JP | 02 271928 A | | 11/1990 |
| JP | 05 147950 A | | 8/1993 |

OTHER PUBLICATIONS

European Search Report, dated Jan. 8, 2002, for European Patent Application No. 01118511.3. 3 pps.
International Search Report, dated May 27, 2003, issued by the European Patent Office, for International Patent Application No. PCT/EP02/04371 (7 pages).

* cited by examiner

*Primary Examiner*—Sean Vincent
(74) *Attorney, Agent, or Firm*—Smith, Gambrell & Russell, LLP

(57) ABSTRACT

Sol-gel process for the production of optical fiber preforms or overcladdings by preparing a sol, gelling the sol, drying the wet gel to a dry porous gel and densifying the dry gel to fully dense glass, wherein during the calcination treatment from 350° C. to 900° C. to remove organic impurities in the dry gel, it is carried out at least one reduced-pressure phase at a pressure comprised between about 0.01 and 0.5 bar.

8 Claims, 2 Drawing Sheets

SOL-GEL PROCESS FOR THE PRODUCTION OF OPTICAL FIBER PREFORMS

INTRODUCTION AND BACKGROUND

The present invention relates to a sol-gel process for the production of optical fiber preforms or overcladdings.

As it is well known optical fibers, widely used in telecommunications, are constituted by a central part, the so-called "core", and a mantle surrounding the core, generally referred to as "overcladding". A difference between the refractive index of core and overcladding in the range 0.1–1% helps confining the light in the core. This refractive index difference is obtained through different chemical compositions for core and overcladding.

Though many combinations are studied, the most common is a Germanium Oxide doped Silicon Oxide glass core ($GeO_2$—$SiO_2$) surrounded by a $SiO_2$ glass overcladding. The most widely used optical fibers are of the monomodal type, having the characteristic of allowing only one light path. These fibers generally have a core diameter of about 4–8 μm and an outer diameter of the overcladding of 125 μm.

The most important parameter in evaluating the quality of a fiber is its optical loss, that is mainly due to light absorption and scattering mechanisms in the fiber and is measured in Decibel per kilometer of fiber (dB/Km).

As it is well known to those skilled in the art, UV attenuation is mainly due to absorption by cations (such as transition metal cations) present in the fiber core, while attenuation in the IR field is mainly due to absorption by —OH groups that may be present in the glass. In between, optical loss is mainly due to scattering phenomena, attributable to fluctuations of refractive index due to non-homogeneity in glass density, as well as to defects in the fiber structure, such as imperfections at the core-overcladding contact surface, bubble or cracks in the fiber, or impurities incorporated in the fiber as a result of the production process.

Optical fibers are produced by drawing a preform at temperatures around 2200° C. The preform is an intermediate product in fibers production, made up of an internal rod and an outer mantle corresponding to core and overcladding in the final fiber. Mantle to rod diameters ratio in the perform is the same as overcladding to core ratio in the final fiber. In the following, the terms rod and core will be used for the inner parts respectively of the preform and of the final fiber, while the term overcladding will be used to designate the outer portion of both preforms and fibers.

It is known that the overcladding of commercially available optical fibers is produced by several modifications of the basic Chemical Vapour Deposition (CVD) process. All the CVD-derived processes generally imply the use of gaseous mixtures comprising Oxygen ($O_2$) and Silicon Chloride ($SiCl_4$) or Germanium Chloride ($GeCl_4$) in a oxyhydrogen torch to produce $SiO_2$ and $GeO_2$ according to the reactions:

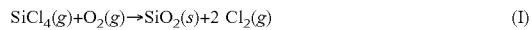
(I)

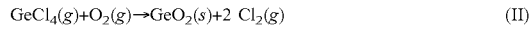
(II)

The thus produced oxides may be deposited in particle form (so-called "soot") on a mandrel that is then removed, or alternatively, on the inner surface of a tubular silica support that's later on drawn as a part of the final fiber.

CVD-based processes have proven capable of producing optical fibers with losses as low as about 0,2 dB/Km (at a wavelength of transmitted light of 1.55 μm), and represent the state-of-the-art in this field.

Though these production methods are quite satisfactory form the standpoint of performances, their production rates are limited thus resulting in high production costs The sol-gel process is a chemical way to produce glasses or ceramics starting from a liquid solution, which in respect to CVD allows for a number of possible modifications, all of which however are characterized by comprising the following steps:

preparation of the sol. In this step, a precursor containing a cation the oxide of which is to be produced, is dispersed or dissolved in a liquid medium. Depending on the nature of the precursor, the liquid medium may be water, an alcohol, or a hydro-alcoholic mixture. Dispersion or dissolution of the precursor may be aided by using chemical means, such as acids, or mechanical and/or physical means, such as vigorous stirring or ultrasound agitation. In the case of silicon, commonly used precursors are alkoxides, such as Si(OCH3)4 (Tetramethylorthosilane or TMOS) and Si(OCH2CH3)4 (Tetraethylorthosilane or TEOS), or pyrogenic silica nanoparticles produced according to reaction (I) above; a commercially available example of this form of silica is Aerosil OX 50 produced by Degussa A.G. Mixed-oxides compositions may be obtained by preparing in this step a sol including precursors of more than one cation;

gelation of the sol. In this step, the precursor molecules or particles react forming a three-dimensional network of cation-oxygen bonds. The final result of this process is a porous monolith composed of an inorganic polymer including essentially the whole amount of the cation initially added in form of its precursor;

drying the wet gel. The gel produced in the former step contains in its pores all of the liquid initially present as solvent of the sol, and possibly other liquids added or produced during the process. In this step, the liquid phase in the gel pores is completely removed. This can be accomplished by normal evaporation of the liquid phase, obtaining a so-called "xerogel" or by supercritical extraction of the liquid, obtaining a so-called "aerogel". Xerogels and aerogels differ for some physical features: xerogels have pores of diameter generally lower than pores of aerogels; also, xerogels have generally a hydrophilic surface, while aerogels have generally a hydrophobic surface. Irrespective of these differences, a dry gel (both xerogel and aerogel) essentially corresponds to the product of the CVD processes.

The dry gels thus obtained can then be densified to the correspondent glass by suitable thermal treatments. The densification temperature of dry gels is between about 900° C. and 1500° C. at most, depending on the precursors employed and on the production process. Aerogels have generally higher densification temperatures than xerogels.

As it is well known, during the thermal treatments for complete densification of the dry gel, it is possible to include operations for its chemical cleaning. By these treatments, it is possible to take advantage of the porosity of the dry gel for gas-phase "washing" steps capable of removing organic impurities left in the gel from organometallic precursors (such as TMOS and TEOS cited before), as well as water, hydroxy-groups bound to cations in the gel network, or atoms of undesired metals.

In general, the removal of organic impurities is realized by a calcination treatment, performed by pouring an oxidizing atmosphere (oxygen or air) in the dry gel at temperatures comprised between about 200 and 800° C.

The removal of water, hydroxy-groups and foreign metals is realized by a purification treatment, pouring in the gel pores $Cl_2$, HCl or $CCl_4$, possibly in mixture with inert gases such as nitrogen or helium, at temperatures between about 400 and 800° C.

The last step is generally a washing treatment, realized with inert gases such as nitrogen, helium or argon, to completely remove chlorine or chlorine-containing gases from the gel pores. After these treatments, the gel is finally densified to full dense glass by heating it to a temperature higher than 900° C., and commonly in excess of 1200° C., in He atmosphere.

The above outlined washing treatments are effective in cleaning the gels to such a degree that the glasses resulting upon their densification are suitable for most applications (generally, mechanical or optical parts). However, it has been found that these treatments leave traces of gaseous compounds into the dense glass. During heating at temperatures in the range 1900–2200° C. needed to draw fibers, these traces of gaseous compounds give rise to microscopic bubbles representing centers of fracture initiation, thus leading to fiber breaks and making the prior art processes not suitable for optical fibers production.

Avoiding the formation of bubbles is the object of some patents.

From U.S. Pat. No. 4,707,174 it is known to avoid bubbles during the sintering of glass bodies produced by a sol-gel process by the addition of a fluorine compound to the porous silica body. However, fluorine is known to affect the refractive index of glasses (specifically, lowering it), so that its use may be not desirable in the production of glasses for optical applications.

U.S. Pat. No. 5,145,510 discloses that it is possible to avoid the formation of bubbles in a sol-gel derived glass by eliminating almost completely the residual —OH groups in dry gel powders, submitting these to a treatment in an atmosphere containing from 10% to 100% of steam at a temperature in excess of 1000° C. This method however is specific for sol-gel derived powders, being thus not applicable to the direct production via sol-gel of optical fiber preforms in their final form.

U.S. Pat. No. 5,236,483 discloses a method that, applied to xerogel derived glasses, allows these to be drawn into optical fibers without giving rise to the formation of bubbles. This method consists in a thermal after-treatment of the dense glass at a temperature comprised between 1500 and 2200° C. for a time comprised between 10 seconds and 5 hours, followed by a gradual cooling below 1200° C., in order not to cause mechanical stress in the final glass. The method disclosed in this patent can only be applied to xerogel-derived glasses. Xerogels, however, have the disadvantage of requiring very long times for drying (the examples in the patent show drying times of at least 7 days up to 20 days for specimens of bigger dimensions).

From the standpoint of industrial processes, it would be better to produce glasses through the aerogel route, because supercritical drying requires 2–3 days, irrespective of the dry gel body dimensions.

The process according to U.S. Pat. No. 5,236,483 shows the disadvantage, that subjecting an aerogel derived glass to the thermal treatment of U.S. Pat. No. 5,236,483 does not avoid the formation of bubbles in the following fiber-drawing operations.

It is thus the object of the present invention to provide a sol-gel based process for the production of optical fiber preforms or overcladdings suitable to be drawn yielding optical fibers with characteristics comparable to those of the state-of-the-art CVD-derived fibers.

SUMMARY OF THE INVENTION

The above and other objects of the invention can be achieved by carrying out a sol-gel process for the production of optical fiber overcladdings or complete preforms comprising preparing a sol, allowing the sol to gel under high-speed rotation in order to obtain a cylindrical gel, drying the wet gel to a dry porous gel by supercritical drying and densifying the dry gel to fully dense glass by thermal treatments, characterized in that the densification thermal treatments comprise a calcination treatment carried out under pure oxygen or a mixture of oxygen and an inert gas or gases, and that during this treatment the gel is subjected to at least one reduced-pressure phase, wherein said reduced-pressure is equal or greater than 300 mbar.

As inert gas a noble gas like helium, argon, or nitrogen can be used. The process of the invention overcomes the problem of formation of bubbles during drawing of fibers from aerogel-derived glasses. The inventors have surprisingly found that, different from xerogels, aerogels can take up gas traces at relatively low temperatures that cannot be eliminated with subsequent gas-washing treatments of the porous gel or with annealing treatments of the resulting dense glass, such as the treatment of U.S. Pat. No. 5,236,483, while these traces of gases can be eliminated by at least one reduced pressure step during calcination, at comparatively low temperatures.

The first steps of the sol-gel process according to the invention can be carried out following any known sol-gel recipe. For instance, the sol can be produced using alkoxides (TMOS or TEOS or similar compounds) or, in alternative, a suspension of pyrogenic silica such as the cited Aerosil OX 50. It is also possible to prepare the sol using a mixture of alkoxides and pyrogenic silica as disclosed in U.S. Pat. No. 4,680,048 which is relied on and incorporated herein by reference. Stabilization of the different sols may be obtained by employing chemical additives according to the known techniques. For example, alkoxide-based sols are stable towards gelling at pH values below about 2 (addition of acids), while pyrogenic silica-based sols are stable at high values of pH, e.g., over 11 (addition of bases). Other additives can be added, such as agents for the control of pore size distribution that help obtaining gels of enhanced mechanical strength. These additives are, for example, glycerol, formamide and organic acids such as oxalic acid disclosed in U.S. Pat. No. 4,851,150; trioxane disclosed in U.S. Pat. No. 4,810,674; polymers disclosed in U.S. Pat. No. 5,240,488; or ketomalonic acid of U.S. Pat. No. 5,196,382. Homogeneity of the sols may be assured by mechanical stirring or through ultrasonic agitation. The prior patents are relied on and incorporated herein by reference.

The thus prepared sol can be destabilized and caused to gel by changes in temperature or, particularly, in pH, increasing pH in the range 4–6 in case of acid sols, or lowering pH below about 10.5 in case of basic sols.

As it is well known, the overcladding geometry is easily obtained by pouring the sol into a cylindrical mold having an internal volume higher than the sol volume, and putting the mold under rotation at high speed around its axis during all the time required for complete gelation. The technique is described, for instance, in U.S. Pat. Nos. 4,680,045 and 4,726,828 which are relied on and incorporated herein by reference.

Alternatively a optical fiber preform comprising an overcladding and central rod can be obtained by pouring the sol into a cylindrical mold provided with a second cylinder of a proper external diameter, contained and centered inside the first mold cylinder. The second cylinder is removable by extraction and must be removed after gelation of the sol, but before the syneresis take place. This technique is described in U.S. Pat. No. 5,240,488 which is relied on and incorporated herein by reference. In this way it is possible to produce the overcladding of the preform.

According to the invention a complete optical fiber preform comprising an overcladding and a central rod is obtained by pouring the sol into a cylindrical mold containing already said rod disposed coaxially with the mold and rotating the mold at a given speed depending on the radius of the rod.

A complete preform can be obtained according to the teachings of co-owned International patent application WO 00/53536, that overcomes the problem of producing a gel around a hard body. This is generally not possible because during gelling the formation of the three-dimensional gel network cause the material to shrink and reduce its lateral dimensions of a few percent. Normally, gels formed around a hard body crack due to this shrinking effect. According to the International application above, it is however possible to obtain a gel around a hard body by pouring the sol into a mold containing already said body disposed coaxially with the mold and then rotating the mold at a given speed depending on the radius of the hard body. In the case of the production of complete optical fiber preforms, the hard body can be a fully dense cylindrical glass rod of mixed composition $SiO_2$—$GeO_2$, while the sol comprises $SiO_2$ glass precursors only. The obtained wet gel (the overcladding, optionally containing the inner rod) is then dried according to the technique of supercritical extraction of the liquid in the pores, optionally after at least one exchange of the liquid in the gel pores with another one having lower supercritical constants, following principles well-known to those skilled in the art.

The dry gel produced in the previous steps can then be subjected to the sequence of thermal treatments comprising calcination for removal of organic residues, treatment with chlorine or a chlorine-containing gas for the removal of metal ions, and final "washing" with an inert gas to remove remainders of the previous treatments, prior to the complete densification to glass. According to the invention, at least one reduced-pressure phase is performed during the calcination treatment. The calcination treatment can be carried out at a temperature comprised from 35° C. to 900° C. In a preferred modification of the invention the pressure during the reduced pressure phase can be between 0.005 and 0.1 bar. Apart from the reduced-pressure phase (essentially taking place under vacuum), such treatment may be carried out under an atmosphere containing oxygen alone or in combination with noble or inert gas or gases.

The reduced pressure in the treatment chamber may be simply obtained by extracting the contained gas with mechanical pumps connected to one of the ports provided in the chamber for flowing gases through it.

BRIEF DESCRIPTION OF DRAWINGS

The present invention will be described in detail in the following with reference to the annexed Figures, wherein.

DETAILED DESCRIPTION OF INVENTION

Figure 1:
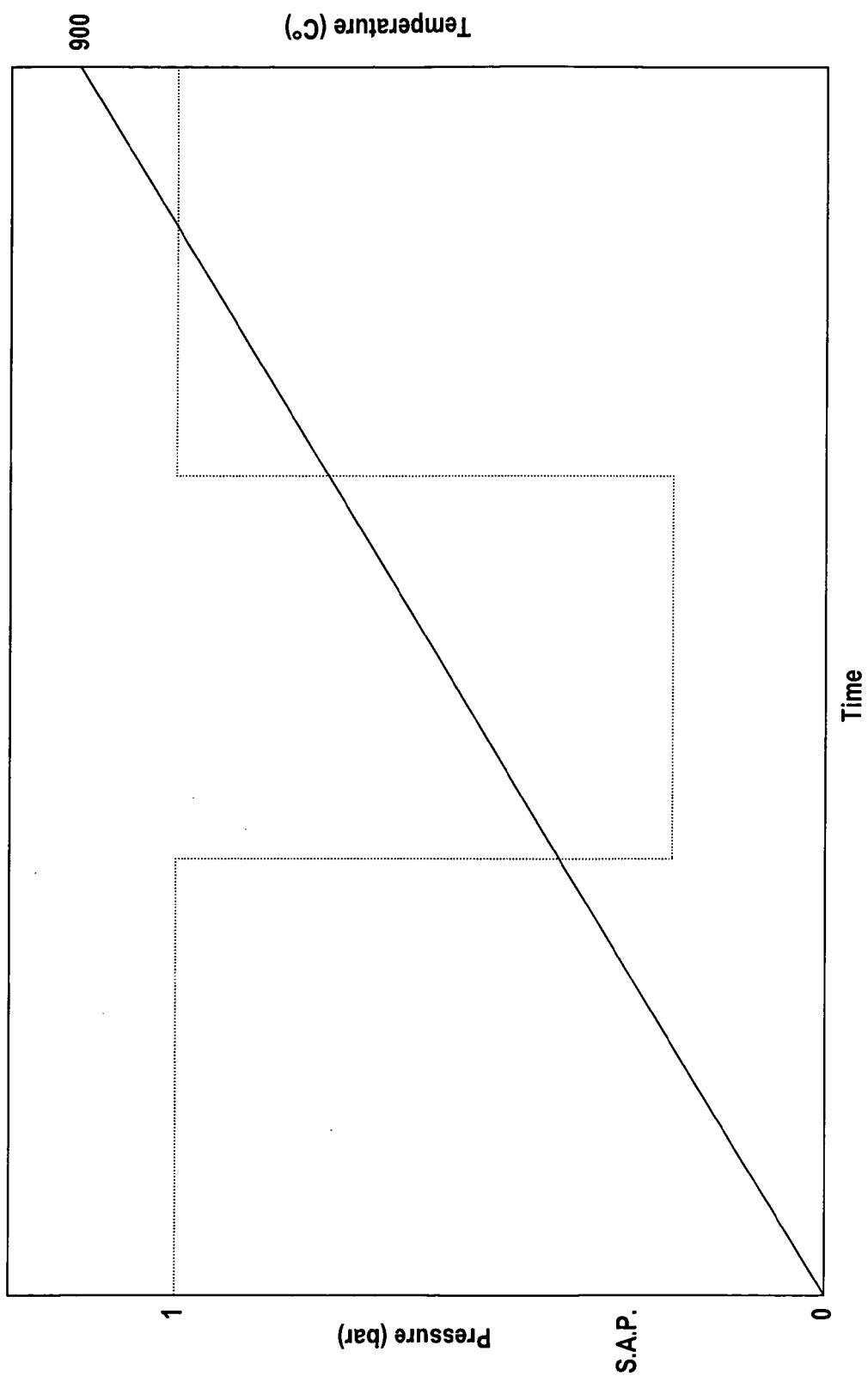
FIG. 1 schematically shows the temperature and pressure profiles during the process of the invention in a first embodiment thereof.

According to FIG. 1 the temperature and pressure profiles are noted as a function of time (no precise values of time are indicated) during the characterizing section of the process of the invention, that is, calcination. The temperature profile is given by the continuous line, while the pressure profile is given by the dotted line. In the figure it is represented the simplest possible embodiment of the process of the invention, wherein during calcination a single reduced-pressure phase is applied. At the beginning of the thermal treatment, the chamber where the dry gel is contained is evacuated and backfilled with the desired atmosphere, e.g., pure oxygen. Heating is then started, bringing the gel from room temperature to a temperature in excess of 350° C. and that may be as high as 900° C. During the thermal treatment according to FIG. 1, pressure is reduced once from its initial value of 1 bar to a value comprised between 0.01 and 0.5 bar (indicated in the figure as S.A.P, that is, Sub-Atmospheric Pressure), and then brought back to 1 bar in the oxidizing atmosphere. Preferably, the reduced-pressure value is comprised between 0.05 and 0.1 bar. In the figure it is represented the simple case in which heating rate is kept constant in the whole temperature range. However, as it is well known to those skilled in the art, thermal treatments of dry gels (among which calcination) may comprise several parts, alternating heating ramps to temperature plateaux.

Figure 2:
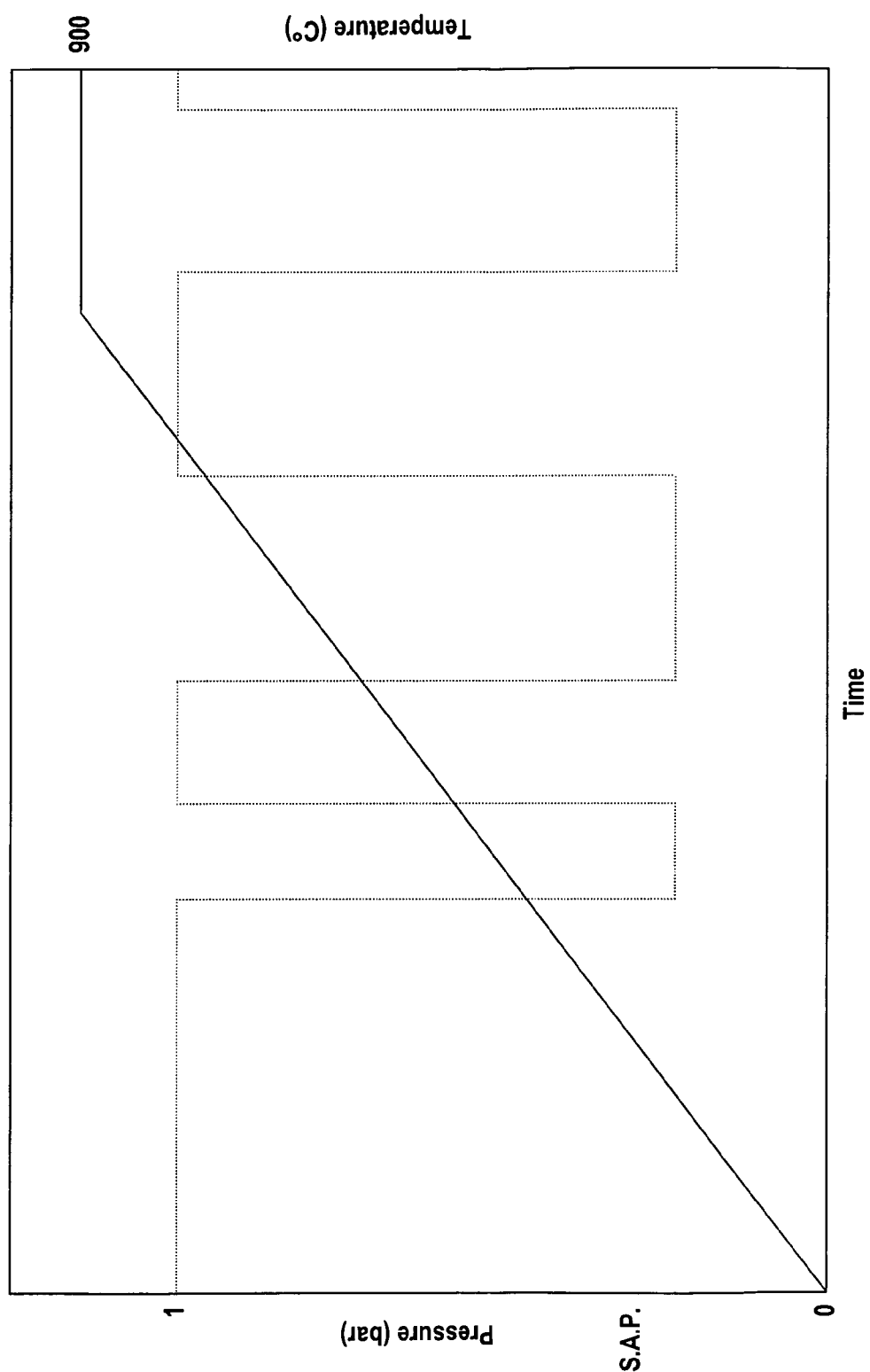
FIG. 2 schematically shows the temperature and pressure profiles during the process of the invention in a second possible embodiment thereof.

According to FIG. 2 a second possible embodiment of the process of the invention is schematically represented, in which the same symbols have the same meaning as in FIG. 1. This second process is essentially similar to the one described with reference to FIG. 1, with the only difference that more than one reduced-pressure phase is employed (the figure exemplifies the case of three such treatments). In this case, simply as an example, temperatures of the different process phases are given. In this process particular, a first reduced-pressure phase is applied at a relatively low temperature, around about 400° C. when calcination has just begun. A second reduced-pressure phase is applied at an intermediate temperature, between about 500 and 700° C.; and a third reduced-pressure phase is applied around the end of the calcination treatment, at a temperature of about 900° C. and during a temperature plateau phase. After completion of the calcination treatment according to any of the embodiments above described, the dry gel is subjected to the following treatments known in the art, that is, a washing step in chlorine or a chlorine-containing gas, and the final densification treatment, generally carried out under a noble gas such as helium or under reduced pressure.

The dense gel obtained according to this process is suitable to be drawn without developing cracks to an optical fiber having characteristics comparable to that of CVD-derived fibers. The drawing operations are carried out according to the standard procedures normally adopted for CVD-derived preforms.

The invention will be further illustrated by the following examples, that also represent the best mode presently contemplated by the inventors for carrying out the invention.

EXAMPLE 1 COMPARATIVE

This example describes the production of a quartz overcladding according to the prior art. In a clean atmosphere free from particulate contamination, a sol is prepared as follows. 900 g of TEOS (Tetraethylorthosilane) are added to 2,700 g of HCl 0.01N, mixed mechanically to obtain a liquid emulsion of two unmiscible liquids and ultrasonically stirred for 25 minutes to hydrolyse the TEOS (Tetraethylorthosilane). Ethanol resulting from hydrolysis is removed in an evaporator at reduced pressure. 570 g of pyrogenic $SiO_2$ (Aerosil OX-50) are added and homogenized by mechanical stirring for 20 minutes at 3000 rpm and 10 minutes at 10000 rpm. The suspension is ultrasonically stirred for 10 minutes, centrifuged for 20 minutes at 1000 g, conditioned to pH 4 by addition of dilute $NH_4OH$ with vigorous stirring and poured into a cylindrical mould fit for axial rotation. The internal volume of the mould is 2,262 ml. The volume of the suspension poured in the mould is 1,965 ml. The sealed mould is set in rotation at 1200 rpm and the suspension is allowed to gel. After 8 hours the gel is dehydrated in acetone until the $H_2O$ contents in the liquid surrounding the gel is $\leq 0.1\%$ by volume. The acetone is then replaced with n-heptane and the gel hypercritically dried at a temperature of 280° C. and a pressure of 55 bar.

It is obtained a cylindrical aerogel with the following dimensions:
outer diameter=79.5 mm,
inner diameter=29.0 mm,
length=440 mm.

The aerogel is then subjected to a series of thermal treatments to convert it into fully dense silicon dioxide glass.

These treatments are carried out introducing the aerogel in an oven having the sample chamber made of quartz. The quartz chamber is connected through computer-controlled on-off valves to a gas inlet line and to a vent line, and through a non-return valve to a vacuum pump.

In particular, the aerogel is subjected to the following treatments:
i) a calcination step for removing organic moieties, by filling the sample chamber at room temperature with 1 bar of pure oxygen, heating to 800° C. during 8 hours,
ii) a step of removal of metallic atoms lasting 46 hours at 800° C. by using a gaseous mixture of 20% HCl in helium, total pressure 1 bar;
iii) a washing step in pure helium at 1 bar, to remove traces of HCl and any other gaseous species, carried out at 800° C. for 10 hours;
iv) finally, a densification treatment carried out heating the gel at a rate of 100° C./hour from 800° C. to 1380° C., under helium at 1 bar.

As a result of this process, a glass cylinder is obtained, having:
outer diameter=42.0 mm,
inner diameter=15.3 mm,
length=232 mm.

This cylinder is sample 1. The glass quality evaluated by visual inspection is excellent. No gas bubbles are observed by laser inspection.

EXAMPLE 2 ACCORDING TO THE INVENTION

This example describes the production of a quartz overcladding according to the invention. A dry aerogel is produced following the same procedure described in example 1. This aerogel is subjected to conditioning and densification treatments similar to those described in example 1, apart for the calcination phase carried out in the following way: filling the sample chamber at room temperature with 1 bar of pure oxygen, heating to 800° C. during 4 hours, lowering the pressure at 0.05 bar for 2 hours and then another 2 hours in oxygen at 1 bar, always keeping the temperature at 800° C. The change of pressure from 1 bar to 0.05 bar is carried out through a computer employing program that, at preset times, turns the vacuum pump on while simultaneously closing the gas inlet line and vent line valves, and then turns the pump off and opens the gas inlet line and vent line valves to reinstate the atmospheric pressure in the desired gas. A fully dense glass cylinder is obtained having essentially the dimensions of sample 1. This cylinder is sample 2. The glass quality evaluated by visual inspection is excellent. No gas bubbles are observed by laser inspection.

EXAMPLE 3

The high temperature behaviour of samples 1 and 2 is compared.

Samples 1 and 2 are both subjected to a temperature of 1750° C. for 1 hour in air in a proper oven. After cooling, 1 cm thick slides are cut from the two samples and inspected for gas bubbles by transmission optical microscopy and by laser scattering. Results are summarized in table 1.

TABLE 1

| Sample | Microscopy | Laser scattering |
|---|---|---|
| 1 | Few small bubbles, otherwise optical quality | Few small bubbles, otherwise optical quality |
| 2 | No bubbles, excellent optical quality | No bubbles, excellent optical quality |

Samples 1 and 2 are then both subjected to a temperature of 2200° C. under nitrogen atmosphere in the furnace of a pulling tower for drawing optical fibers.

Sample 1 cannot successfully be pulled for the presence of considerable gas bubbles developed in the material at the test temperature.

Sample 2 is pulled into a tube 5 mm in diameter of perfect cylindrical geometry and apparently of excellent optical quality.

The material from both samples is then inspected for presence of gas-bubbles by transmission optical microscopy and by laser scattering. The results are summarized in table 2.

TABLE 2

| Sample | Microscopy | Laser scattering |
|---|---|---|
| 1 | Presence of many bubbles up to several millimeters in size | Presence of many bubbles up to several millimeters in size |
| 2 | No bubbles, excellent optical quality | No bubbles, excellent optical quality |

As it clearly appears from the results of high temperature testing given above, the sample 2 produced according to the process of the invention can be treated at the highest temperature (2200° C.) and pulled to reduce its section. In this process, no evidence arises of mechanical problems due to mechanical defects in the sample, and the optical analysis of the cylinder resulting from the pulling operation shows no bubbles and excellent optical properties suitable for use in optical fiber communications.

To the contrary, sample 1, which is according the art shows the formation of small bubbles already at the lower test temperature (1750° C.), which increase in number and volume at the test higher temperature (2200° C.). This makes the use of sample 1 for optical fiber formation impossible. Sample 1 causes both the high light scattering and the poor mechanical resistance at drawing due to the presence of these bubbles. Further variations and modifications will be apparent to those skilled in the art from the foregoing and are intended to be encompassed by the claims appended hereto.

European Patent Application 01118511.3 is relied on and incorporated herein by reference.

We claim:

1. Sol-gel process for the production of optical fiber preforms or overcladdings comprising preparing a sol, allowing the sol to gel under high-speed rotation in order to obtain a cylindrical gel which is a wet gel, drying the wet gel to a dry porous gel by supercritical drying and densifying the dry porous gel to fully dense glass by thermal treatments, said densifying being a thermal treatment of calcination carried out under pure oxygen or a mixture of oxygen and an inert gas or gases, and during this calcination treatment the gel is subjected to at least one reduced-pressure phase, wherein said reduced-pressure phase at least 300 mbar below the atmospheric pressure.

2. The sol-gel process according to claim 1 wherein the pressure during said at least one reduced-pressure phase is from 0.05 to 0.1 bar.

3. The sol-gel process according to claim 1 wherein said calcination is carried out at a temperature of from 350 C. to 900 °C.

4. The sol-gel process according to claim 1 wherein the sol is prepared using one or more silicon alkoxides or a suspension of pyrogenic silica or a mixture of one or more silicon alkoxides and pyrogenic silica.

5. The sol-gel process according to claim 1 wherein an optical fiber overcladding is obtained by pouring the sol into a cylindrical mold having an internal volume higher than the sol volume, and putting the mold under rotation at high speed around its axis during all the time required for complete gelation.

6. The sol-gel process according to claim 1 wherein a complete optical fiber preform comprising an overcladding and a central rod is obtained by pouring the sol into a cylindrical mold containing already said rod disposed coaxially with the mold and rotating the mold at a given speed depending on the radius of the rod.

7. The sol-gel process according to claim 6 wherein the rod is a fully dense cylindrical glass rod of mixed composition $SiO_2$—$GeO_2$ and the sol comprises silicon oxide precursors only.

8. The sol-gel process according to claim 1 wherein, before subjecting the wet gel to supercritical drying, further comprising carrying out at least one exchange of liquid in the gel pores with another one having lower supercritical constants.

* * * * *